United States Patent [19]
Körber

[11] 4,291,963
[45] Sep. 29, 1981

[54] ELECTRONIC FLASHER

[75] Inventor: Hermann Körber, Bünde, Fed. Rep. of Germany

[73] Assignee: Balda-Werke, Bünde, Fed. Rep. of Germany

[21] Appl. No.: 57,687

[22] Filed: Jul. 16, 1979

[51] Int. Cl.³ .............................................. G03B 15/05
[52] U.S. Cl. ..................................... 354/128; 354/145
[58] Field of Search ............... 354/127, 128, 139, 145, 354/149, 289

[56] References Cited
U.S. PATENT DOCUMENTS

| 4,016,575 | 4/1977 | Uchiyama et al. | 354/139 X |
| 4,084,167 | 4/1978 | Iwata | 354/149 X |
| 4,135,797 | 1/1979 | Ohmura et al. | 354/128 |

Primary Examiner—Michael L. Gellner
Attorney, Agent, or Firm—Howard I. Schuldenfrei

[57] ABSTRACT

An improved electronic flasher for a camera having automatic power cut-off means for automatically cutting the power input to the charging circuit thereof when the device is ready to flash is provided with means for producing a flash sufficiently luminescent for picture taking for a finite period of time after power input thereto has been cut-off. The improved flasher includes a two-way switching means, an electromagnet and a charge indicating means, for instance, a glow lamp, which provides the operator with a positive indication when the device is suitably charged to provide a satisfactory flash. The switching means and electromagnet cooperate to form a relay for controlling current feed to a flasher circuit high-voltage capacitor as a function of the condition of charge thereof, the electromagnet being concomitantly controlled by the charge indicating means as a corresponding function of the voltage present thereon. The electromagnet is electrically connected downstream of the charge indicating means and energization thereof is controlled thereby. The charge indicating means is connected to a voltage divider having a first arm comprising a fixed resistor and second arm comprising a variable resistor, the variable resistor having different resistances during and after the charging of the device. The resistance of the second arm of the voltage divider may be varied, for instance, by providing switching means for bridging a portion of the resistor. Suitable switching means which may be employed to effect the bridging function include, for example, a transistor which may perform either a blocking or conductive function in relation to the position of the two-way switching means.

4 Claims, 4 Drawing Figures

ELECTRONIC FLASHER

BACKGROUND OF THE INVENTION

The present invention relates generally to an improved electronic flasher for a camera having means for automatically cutting power input to the charging circuit thereof when the device is prepared to flash and, more particularly, to an improved electronic flasher of the type described which is capable of producing a flash sufficiently luminescent for picture taking for a finite period of time after power input thereto has been cut-off. The instant invention is suited to conventional cameras having built-in electronic flash units as well as cameras adapted to receive demountable flash units.

Conventionally, electronic flash units are activated or deactivated by a manual two-way switch having ON-OFF power input settings. There is a finite time lapse between the instant the device is activated and the instant the device is charged to a condition of flash readiness. Since the device is either incapable of producing a sufficiently luminescent flash or incapable of producing any flash until adequately charged, an indicating means, such as a glow lamp, is usually associated with the charging circuit thereof for the purpose of signaling when the device has reached a condition of flash readiness.

While illumination of the glow lamp is a positive indication that the device is charged for flashing, it is an unreliable indicator as employed in these conventional devices. For example, the glow lamp may continue to provide a positive indication after the ON-OFF switch is flipped to the OFF position although the device is only capable of producing a flash which is insufficiently luminescent for picture taking. This aspect of the operation of these devices represents a distinct disadvantage, and this condition is particularly likely to occur when the device has been unused and uncharged for a long period of time.

Retention of the minimum charge necessary for suitably flashing these conventional devices requires continuous charging of the unit unitl the instant of flashing. After flashing, the charging process is immediately recommenced unless the device is shut-off. Minimization or avoidance of this problem requires that the device be constantly charged, even during periods of non-use which shortens the useful life of the power source, usually batteries, employed in these devices.

Accordingly, the flasher devices constructed according to the instant invention include means for providing a suitably luminescent flash for a finite indicated period time after the power input thereto is cut-off.

SUMMARY OF THE INVENTION

Generally speaking, in accordance with the invention, an improved electronic flasher for a camera having automatic power cut-off means for automatically cutting the power input to the charging circuit thereof when the device is ready to flash is provided with means for producing a flash sufficiently luminescent for picture taking for a finite period of time after power input thereto has been cut-off. This improved flasher includes the charging circuit and automatic return two-way switching means which is disclosed in copending application Ser. No. 52,414 to Manfred Mailänder filed June 27, 1979, entitled Electronic Flash For A Camera. The invention is suited to flasher units of the type having a high-voltage capacitor included in the charging circuit thereof which is required to be sufficiently charged to effect flashing.

An improved flasher constructed according to this invention includes a two-way switching means, an electromagnet and a charge indicating means, for instance, a glow lamp, which provides the operator with a positive indication when the device is suitably charged to provide a satisfactory flash. The switching means and electromagnet cooperate to form a relay for controlling current feed to a flasher circuit high-voltage capacitor as a function of the condition of charge thereof, the electromagnet being concomitantly controlled by the charge indicating means as a corresponding function of the voltage present thereon. The electromagnet is electrically connected downstream of the charge indicating means and energization thereof is controlled thereby. The charge indicating means is connected to a voltage divider having a first arm comprising a fixed resistor and second arm comprising a variable resistor, the variable resistor having different resistances during and after the charging of the device. The resistance of the second arm of the voltage divider may be varied, for instance, by providing switching means for bridging a portion of the resistor. Suitable switching means which may be employed to effect the bridging function include, for example, a transistor which may perform either a blocking or conductive function in relation to the position of the two-way switching means.

As thus operatively connected, an artificial hysteresis is produced in the device. As a result of this phenomenon, satisfactory flash pictures may be taken with the device after the power input thereto is cut-off. During the finite hysteresis period, the charge indicating means, namely the glow lamp, continues to provide the operator with a positive indication that the device is ready to flash and during such period the flash capable of being produced by the device is sufficiently luminescent for a satisfactory picture.

Accordingly, it is an object of this invention to provide an electronic flash device having automatic power cut-off means therein with a means for producing a satisfactory flash for a finite time interval after the source of power therein is cut-off.

Another object of the invention is to provide a flash device with a means for producing a positive signal to the operator during the post power cut-off operative interval.

Still other objects and advantages of the invention will in part be obvious and will in part be apparent from the specification.

The invention accordingly comprises the features of construction, combinations of elements and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 1 is a fragmentary detailed view of an electronic flasher having automatic power cut-off means of the type which the instant invention may be employed with;

DETAILED DESCRIPTION OF THE INVENTION

Figure 1:
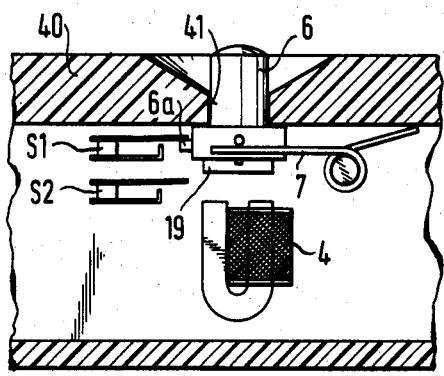
Figure 2:
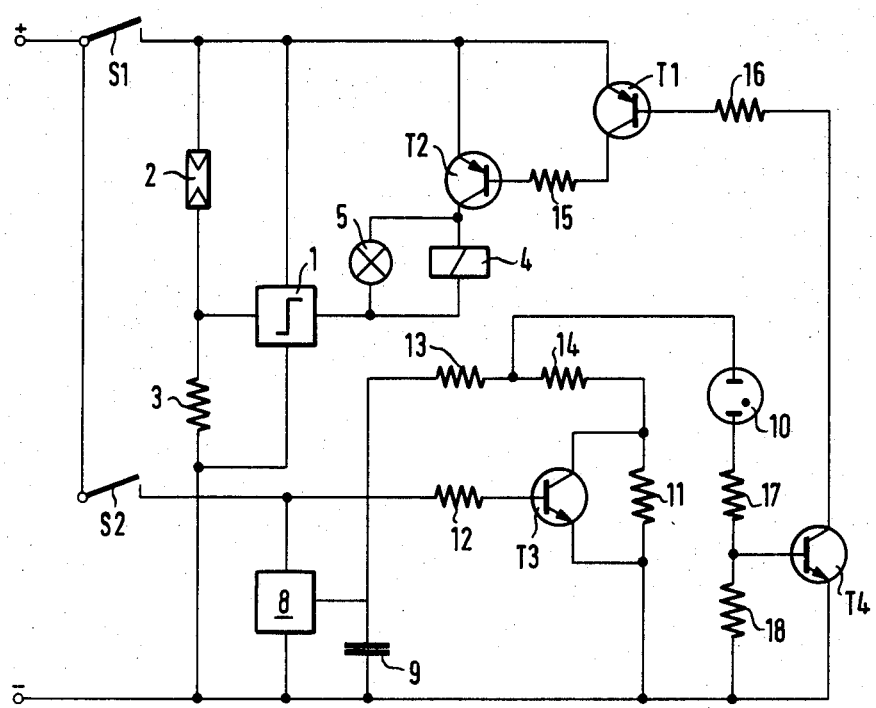
FIG. 2 is a schematic diagram of a circuit for the embodiment seen in FIG. 1 which includes the instant invention.

Referring now to the Drawings, the flasher embodiment depicted in FIGS. 1 and 2 includes a cylindrical switching member 6 movable in a slot 41, formed in a housing 40, between first, seen in FIG. 1, and second positions, the first and second positions thereof corresponding respectively to open and closed switch positions. The housing 40 may be a camera housing or a housing for a discrete flash attachment. Member 6 is a dual function switching member which serves as a means for closing the flasher charging circuit and as a test key for testing whether the level of ambient light in the environment of the camera requires utilization of the flash for picture taking.

Mounted on the end of member 6 extending into housing 40 is an armature 19 which is abuttable into an underlying electromagnet 4 when member 6 is manually depressed into slot 41. To depress member 6 into its second position in slot 41, sufficient downward pressure must be exerted thereon to overcome the force of a return spring 7 mounted in housing 40 which normally biases member 6 towards its first position. An arm of return spring 7 underlies a finger laterally extending from member 6 and exerts sufficient linear force thereon to return member 6 to its first position, in the absence of the application of an opposite force of greater magnitude to member 6.

As best seen in FIG. 1, a pair of switches S1 and S2 are controlled by a lip flange 6a which laterally emerges from member 6. S1 is a normally closed switch, while S2 is a normally open switch. Both switches are arranged in the path of lip flange 6a.

When member 6 is in its first or at rest position, lip flange 6a underlies and abuts the arm of switch S1 with sufficient force to open switch S1, as seen in FIG. 1. The force for opening switch S1 is provided by return spring 7. As member 6 is depressed inwardly towards its second position, lip flange 6a disengages switch S1, which then moves to its normal closed position. When member 6 is fully inwardly depressed into its second position, lip flange 6a abuts and closes switch S2, and armature 19 overlies and engages electromagnet 4.

As hereinafter described in detail, the condition of electromagnet 4, traversed by current or not, is dependent upon the ambient light conditions in the environment of the camera. When electromagnet 4 is traversed by a current, armature 19 is magnetically attracted thereto and concomitantly, member 6 is retained in its second position. The magnetic attraction between electromagnet 4 and armature 19 exceeds the force of spring 7 on member 6. On the other hand, member 6 is restored to its first position by the force of return spring 7 thereon when there is no current traversal through electromagnet 4.

The elements seen in FIG. 1 are schematically depicted in FIG. 2 in the positions shown in FIG. 1. The curcuit seen in FIG. 2 includes means for determining whether the ambient light in the environment of the camera is adequate for taking a picture without a flash. This determination is functionally related to the quantity of ambient light which strikes a photoelectric cell or photoresistor 2 connected in the circuit. To arrive at this determination, member 6 is depressed between its first and second positions, whereby switch S1 is in a closed position, while switch S2 remains in an open position. The test key function of member 6 is illustrated in this intermediate positioning thereof. When switches S1 and S2 are in these respective positions, and adequate ambient light is present for picture taking without a flash, the electrical resistance of photoelectric cell or photoresistor 2 is small as compared with its condition of electrical resistance in the presence of insufficient ambient light.

The circuit seen in FIG. 2 includes a voltage divider comprising photoelectric cell 2 and resistor 3. Resistor 3 is preselected so that under circumstances where sufficient ambient light, for picture taking without flash, strikes photoelectric cell 2, a trigger circuit 1, for instance a Schmitt trigger, is blocked. This blockage prevents illumination of an in-series indicating means 5, such as an indicator bulb, and concomitantly, electromagnet 4 is not magnetically activated by a traversal of current therein.

Indicator bulb 5 does not illuminate under the circumstances heretofore described which is a positive indication to the camera operator that a successful picture may be taken without the use of a flash. Should the camera operator depress member 6 beyond its intermediate position between switches S1 and S2 into its second position, switch S2 will be closed and armature 19 may abut electromagnet 4. But under the circumstance of sufficient ambient light, as hereinbefore described, electromagnet 4 is magnetically inactive. Therefore, member 6 is restored to its first position by spring 7.

When there is insufficient ambient light for picture taking without a flash, the condition of the circuit schematically depicted in FIG. 2 is altered. As previously described, the partial depression of member 6 to an intermediate position results in the closing of switch S1, placing member 6 in test key position. However, the ohmic resistance of photoelectric cell 2 is relatively high, as compared with its resistance in the presence of adequate ambient light, the high ohmic resistance thereof being a consequence of the small amount of ambient light present. Under these conditions, namely insufficient light for picture taking without a flash, current bridges trigger circuit 1, i.e. the Schmitt trigger, as a consequence of the design of the voltage divider subcircuit consisting of photoelectric cell 2 and ohmic resistor 3 applying voltage to indicator bulb 5 and electromagent 4. The voltage applied to indicator bulb 5 illuminates it and magnetically activates electromagnet 4.

Illumination of indicator bulb 5 is a positive indication that prevailing conditions require the use of a flash. For flashing, the operator fully depresses member 6 to its second position, closing switch S2 and abutting armature 19 into magnetically active electromagnet 4. Flashing may be effected through a conventional high voltage flasher 8 of the type which includes a high-voltage capacitor 9 in the charging circuit thereof. Capacitor 9 has been shown in FIG. 2 in detail merely to facilitate the description of the invention. Neither flasher 8 nor the charging circuit therefor are shown in detail because both have been selected from the prior art.

Flasher 8 commences charging when switch S2 is closed. The base of transistor T3 has a positive potential and thus, transistor T3 has a forward mode for bridging resistor 11. Resistor 12 is merely provided as a protective resistor for transistor T3.

Under the conditions thus described, series connected resistors 13 and 14 form a voltage divider. When capacitor 9 reaches a predetermined level of charge and a corresponding capacitor voltage, a glow lamp 10 is illuminated, signaling the operator that the unit is ready to flash. Contemporaneously with illumination of glow lamp 10, transistor T4 becomes conductive as a consequence of the potential imparted to the base thereof in accordance with the relative resistance values of resistors 17 and 18, while transistor T1 is unblocked as a consequence of the negative potential exhibited on the base thereof. Additional transistor protective resistors 15 and 16, are for the purpose of respectively protecting transistors T2 and T1.

When transistor T1 is conductive, the base of transistor T2 exhibits a positive potential and performs a blocking function for the purpose of blocking current to indicator bulb 5 and electromagnet 4. The blockage of current to electromagnet 4 permits spring 7 to restore member 6 to its first position, as seen in FIG. 1. The return of member 6 to its first position provides the camera operator with a second signal, namely a mechanical signal, which advises the operator that the unit has reached a condition of flash readiness. The blockage of current to electromagnet 4 and indicator bulb 5 occurs substantially contemporaneously with the illumination of glow lamp 10, signaling flash readiness. The operator is therefore provided with two (2) signals indicating flash readiness, namely an optical signal when glow lamp 10 illuminates and, substantially contemporaneously therewith, an acoustical or mechanical signal provided by the return of member 6 to its first position.

The return of member 6 to its first position reopens switches S1 and S2, and transistor T3 performs a blocking function, whereas it previously provided a current bridge. Also, the character of resistor 11 is altered; resistor 11, which is bridged in the closed circuit phase, is included in the voltage divider, together with resistors 13 and 14, in the open circuit phase. The voltage on resistors 11 and 14, which are connected in series, changes accordingly. In the absence of a charging current, capacitor 9 gradually discharges. When the voltage on capacitor 9 reduces below a predetermined level, glow lamp 10 is extinguished. Glow lamp 10 is extinguished at a substantially lower voltage level than the voltage level necessary to illuminate it, initially. This phenomenon is brought about because during the initial bridging of resistor 11 the voltage conditions on the voltage divider during the ON-OFF phase differ from each other. This phase difference results in an artificial hysteresis.

Figure 3:
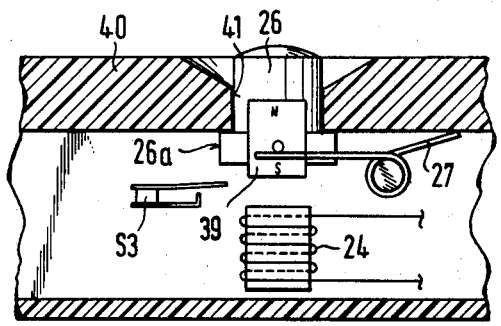
FIG. 3 is a fragmentary detailed view of a section of another automatic power cut-off means for a camera with which the instant invention may be employed.
Figure 4:
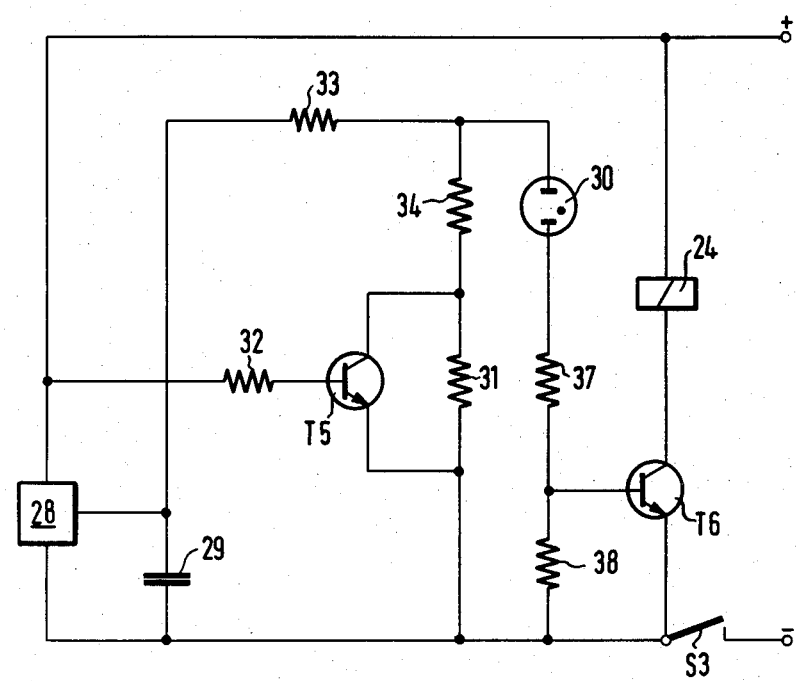
FIG. 4 is a schematic diagram of a circuit for the embodiment seen in FIG. 3 which includes the instant invention.

Referring now to FIGS. 3 and 4 which illustrate an alternate embodiment of the invention and schematically depict a circuit therefor, like parts as shown in FIGS. 1 and 2 are numbered similarly and are numerically stepped-up by an additive factor of 20. The embodiment seen in FIG. 3 differs substantially from the comparable embodiment seen in FIG. 1. For example, member 26 which corresponds to member 6 in FIG. 1 does not have a test key function, and the embodiment seen in FIGS. 3 and 4 does not include any indicator lamp corresponding to indicator bulb 5. Therefore, this embodiment does not include any means which advises the operator concerning prevailing ambient light conditions prior to picture taking. The operator's choice of using the flasher or not is purely discretionary. Additionally, the embodiment seen in FIGS. 3 and 4 merely includes a connecting means for making the device ready to flash. The connecting means provides the flasher with sufficient charging current for flashing and stabilizes the flasher in a flash-ready condition, until the charge on high voltage capacitor 29 has diminished below a predetermined minimum value.

Referring now to FIG. 3, a cylindrical switching member 26 having a permanent magnet 39 mounted thereon is movably mounted in slot 41 formed in housing 40. Member 26 is movable between first, seen in FIG. 3, and second positions corresponding respectively to open and closed switch positions. Mounted in housing 40 is an electromagnet 24 which is aligned with member 26 and magnet 39 mounted thereon. Magnet 39 is arranged on member 26 so that its south pole is proximate and north pole distal relative to electromagnet 24. A collar 26a surrounds the edge of member 26 which descends interiorly into housing 40.

A normally open switch S3 is arranged in housing 40 in a path of collar 26a. As member 26 is depressed into its second position, collar 26a engages switch S3 until closure thereof. When member 26 reaches its second position, switch S3 is closed by collar 26a. The second position of member 26 is determined by abutment of magnet 39 into electromagnet 24. Member 26 is normally biased into its first position by a return spring 27 mounted in housing 40 which has a free arm abutting a laterally emergent finger formed on member 26.

Depression of member 26 to its second position closes switch S3, and magnet 39 is magnetically attracted to the core of electromagnet 24. The force of magnetic attraction between magnet 39 and the core of electromagnet 24 exceeds the restorative force of spring 27 on member 26. High-voltage capacitor 29, which is connected in the charging circuit of conventional flasher 28, commences charging the instant switch S3 is closed. As seen in FIG. 4, capacitor 29 is shown as removed from flasher 28, but such removal thereof is merely to facilitate the description of the embodiment. In conventional flashers of the type that may be employed herein, which includes flasher 28, capacitor 29 is conventionally connected in the charging circuit thereof.

During the flasher charging phase, while switch S3 is closed, a transistor T5 bridges resistor 31, and a voltage divider is formed by resistors 33 and 34, which correspond to resistors 13 and 14 in the embodiment seen in FIG. 2.

After capacitor 29 reaches a predetermined level of voltage, glow lamp 30 illuminates, transistor T6 becomes conductive by virtue of the voltage applied to its base as determined by the relative resistance values of resistors 37 and 38 and current is transmitted to electromagnet 24, which is thereby magnetically activated. The polarization of electromagnet 24 is opposite to that of permanent magnet 39, and magnet 39 is repelled thereby, whereby member 26 is returned to its first position by the restorative force of spring 27. Withdrawal of member 26 from its second position opens switch S3 and interrupts the flasher charging phase. Once switch S3 is opened, resistor 31, no longer bridged by transistor T5, forms a member of the voltage divider, which then comprises resistors 31, 33 and 34.

The charge on capacitor 29 begins to gradually diminish after initial illumination of glow lamp 30, unless the device is flashed. When the charge and voltage on capacitor 29 decrease, respectively, below established predetermined levels, glow lamp 30 is extinguished.

The voltage level at which glow lamp 30 is extinguished is substantially lower than the voltage level at which glow lamp 30 illuminates. Therefore, the phenomenon of an artifical hysteresis is produced. Resistors 31, 32, 33, 34, 37 and 38 correspond respectively to their counterparts 11, 12, 13, 14, 17 and 18 shown in FIG. 2.

Electronic camera flashers constructed in accordance with the disclosed embodiments have demonstrated the improved results obtainable from the instant invention, particularly as regards flasher life.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a flash device for a camera of the type including a two-way switching means movable between a first open circuit position and a second closed circuit position, an electromagnet operatively connected to said switching means, said electromagnet being magnetically active when said two-way switching means is in said second closed circuit position, said two-way switching means and said electromagnet being cooperable for thereby forming a relay, a conventional high-voltage flasher having a charging circuit of the type including a high-voltage capacitor, said relay being operatively connected to said charging circuit and controlling current feed to said high-voltage capacitor therein as a function of the level of charge thereof, and a charge indicating means operatively connected to said high-voltage capacitor and said electromagnet for controlling said electromagnet as a corresponding function of voltage present thereon, said charge indicating means providing an operator of said device with a positive indication that said device is ready to flash, the improvement comprising a means connected to said charge indicating means and said high-voltage capacitor in said charging circuit of said device for producing a hysteresis in said connection therebetween, whereby a positive indication produced in said charge indicating means is extinguished at a lower voltage on said high-voltage capacitor than is initially required to produce said positive indication on said charge indicating means.

2. The improvement as claimed in claim 1 wherein said hysteresis producing means comprises a voltage divider having a first arm comprising a fixed resistor and a second arm comprising a variable resistor having different resistances during and after charging of said high-voltage capacitor.

3. The improvement as claimed in claim 2 including switching means connected to said second arm of said voltage divider for varying the resistance of said second arm thereof.

4. The improvement as claimed in claim 3 wherein said switching means comprises transistor means operatively connected to said two-way switching means for blocking and conducting across said second arm of said voltage divider as a function of the position of said two-way switching means.

* * * * *